(12) United States Patent
Choi et al.

(10) Patent No.: US 6,487,054 B1
(45) Date of Patent: Nov. 26, 2002

(54) GROUND DEVICE OF HEAD DRUM APPARATUS

(75) Inventors: Do-Young Choi; Young-Ho Cho; Hyeong-Seok Choi; Choong-Hum Baik; Jun-Young Kim; Seung-Woo Lee; Sung-Hee Hong; Seung-Han Lee, all of Suwon (KR)

(73) Assignee: Samsung Electronics, Co., Ltd., Suwon (KR)

( * ) Notice: Subject to any disclaimer, the term of this patent is extended or adjusted under 35 U.S.C. 154(b) by 45 days.

(21) Appl. No.: 09/589,154

(22) Filed: Jun. 8, 2000

(30) Foreign Application Priority Data

Jul. 22, 1999 (KR) .............................. 99-29708

(51) Int. Cl.⁷ ................................................ G11B 5/52
(52) U.S. Cl. .................................................. 360/271.1
(58) Field of Search ............................... 360/271–271.9

(56) References Cited

U.S. PATENT DOCUMENTS

| | | | | |
|---|---|---|---|---|
| 5,442,506 A | * | 8/1995 | Kang | 360/107 |
| 5,486,966 A | * | 1/1996 | Ahn | 360/107 |
| 5,568,334 A | * | 10/1996 | Lee | 360/107 |
| 5,724,214 A | * | 3/1998 | Ahn | 360/107 |
| 5,734,213 A | * | 3/1998 | Oh | 310/67 R |
| 5,734,530 A | * | 3/1998 | Kim | 360/107 |
| 5,808,841 A | * | 9/1998 | Edakubo et al. | 360/107 |
| 6,018,442 A | * | 1/2000 | Verbunt et al. | 360/107 |
| 6,246,550 B1 | * | 6/2001 | Mun | 360/271.1 |

* cited by examiner

Primary Examiner—Brian E. Miller
(74) Attorney, Agent, or Firm—Robert E. Bushnell, Esq.

(57) ABSTRACT

A head drum apparatus comprises: a lower drum; a stationary shaft pressed and fitted into a center hole of the lower drum; an upper drum rotatably coupled to the stationary shaft via at least one bearing; a boss fixed to the top portion of the stationary shaft by means of a set-screw; a motor rotor mounted to the top surface of the upper drum; a motor stator fixed to the boss, the motor stator being opposite to the motor rotor; and a ground device. The ground device includes an anchor member anchored to the upper surface of the boss and an elastic member fixed to the bottom surface of the anchor member. The elastic member extends downwardly through a bore in the boss, and a ground member is fixed to tile lower end of the elastic member. The ground member is in elastic contact with an outer race of an upper bearing. Accordingly, the assembly and the disassembly operations of the components of the ground device become simpler and easier, thereby increasing the productivity and enhancing the service operation efficiency thereof.

22 Claims, 5 Drawing Sheets

GROUND DEVICE OF HEAD DRUM APPARATUS

CLAIM OF PRIORITY

This application makes reference to, incorporates the same herein, and claims all benefits accruing under 35 U.S.C. §119 from my application STRUCTURE FOR EARTHING OF HEAD DRUM filed with the Korean Industrial Property Office on 22 Jul. 1999 and there duly assigned Ser. No. 29708/1999.

BACKGROUND OF THE INVENTION

1. Field of the Invention

The present invention relates to a ground device for preventing static electricity to improve the electrical stability of a head drum apparatus for use in a magnetic tape recording and reproducing apparatus. More particularly, the invention relates to a ground device of a head drum apparatus capable of making the assembly and disassembly operations of the ground device components simpler and easier, thereby resulting in an increased productivity and an improved service efficiency thereof.

2. Description of the Prior Art

Conventionally, a shaft-rotating type of head drum apparatus has been employed in a magnetic tape recording and reproducing apparatus.

In the shaft-rotating type of head drum apparatus, a rotating shaft is pressed and fitted into an upper drum, and a lower drum is rotatably mounted on a lower portion of the rotating shaft. A motor is attached to the bottom surface of the lower drum and activated to rotate the shaft, and hence the upper drum. A head provided in the upper drum records a signal to or reproduces a signal from a magnetic tape.

However, the head drum apparatus of shaft-rotating type has two degrees of freedom and does not fully overcome resonant vibration problems so that it cannot eliminate the likelihood of malfunction due to resonant vibration upon the rotation of the upper drum.

Recently, in order to solve the above problems, a fixed-shaft type of head drum apparatus has been proposed. The typical constitution of the fixed-shaft type of head drum assembly is burdened by certain disadvantages.

Specifically, a ground device must necessarily be employed with the head drum apparatus in order to prevent static electricity, and resultant electrical instability, from developing in the apparatus. However, such a ground device is necessarily of such a structure as to make it difficult to attach to the drum apparatus, and it is also likely to become detached therefrom after a certain period of use. In addition, disassembly of the ground device is necessarily difficult and time consuming because it is necessary to disassemble the entire head drum apparatus in the process.

Thus, there is a need for the development of a ground device of a head drum apparatus which is not burdened by the above disadvantages.

SUMMARY OF THE INVENTION

It is, therefore, a primary object of the present invention to provide a ground device of a head drum apparatus capable of making the assembly of the ground components thereof simpler and easier, thereby resulting in increased productivity thereof.

It is another object of the present invention to provide a ground device of a head drum apparatus capable of making the disassembly of the components simpler and easier, thereby resulting in improved service efficiency.

In accordance with the present invention, there is provided a head drum apparatus which comprises: a lower drum; a stationary shaft pressed and fitted into a center hole of the lower drum; an upper drum rotatably coupled to the stationary shaft via at least one bearing; a boss fixed to the top portion of the stationary shaft by means of a set-screw; a motor rotor mounted to the top surface of the upper drum; a motor stator fixed to the boss, the motor stator being disposed opposite to the motor rotor; a ground device, including an anchor member, anchored to the upper surface of the boss with an elastic member fixed to the bottom surface of the anchor member, the elastic member extending downwardly through a bore in the boss; and a ground member fixed to the lower end of the elastic member, the ground member being in elastic contact with an outer race of an upper bearing.

Preferably, the anchor member has a hole into which the stationary shaft is fitted, whereby the anchor member is prevented from moving unintentionally when it is anchored to the boss. Preferably, the elastic member is a compressed coil spring.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will now be described in detail with reference to the drawings.

Figure 1:
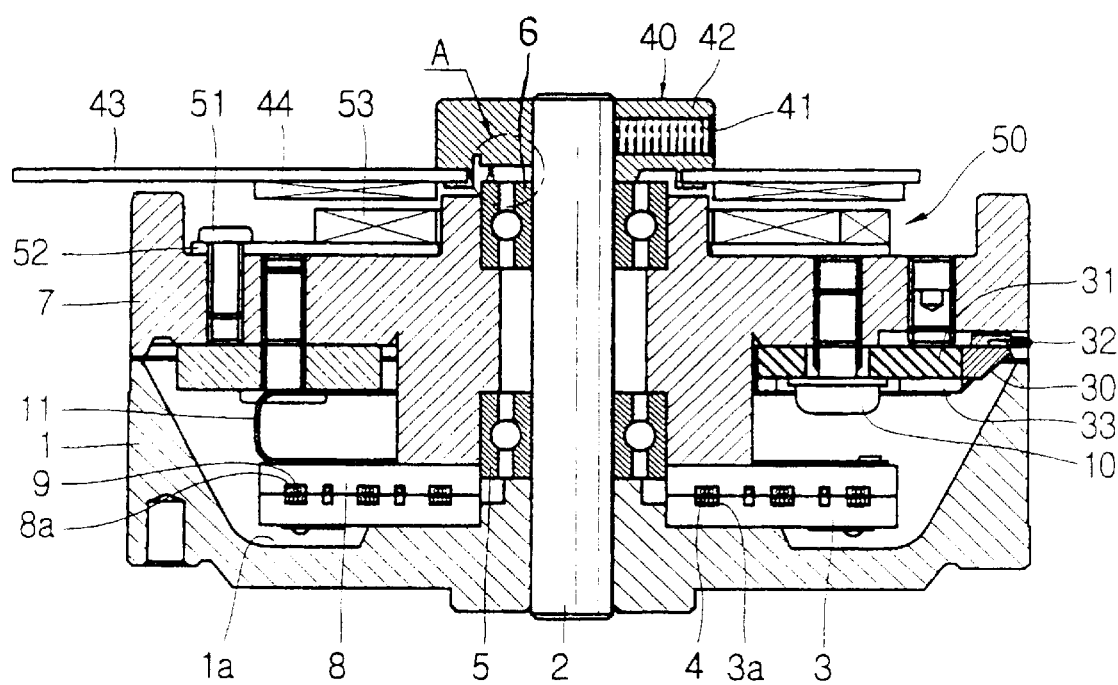
FIG. 1 is a cross-sectional view of a fixed-shaft type of head drum apparatus.
Figure 2:
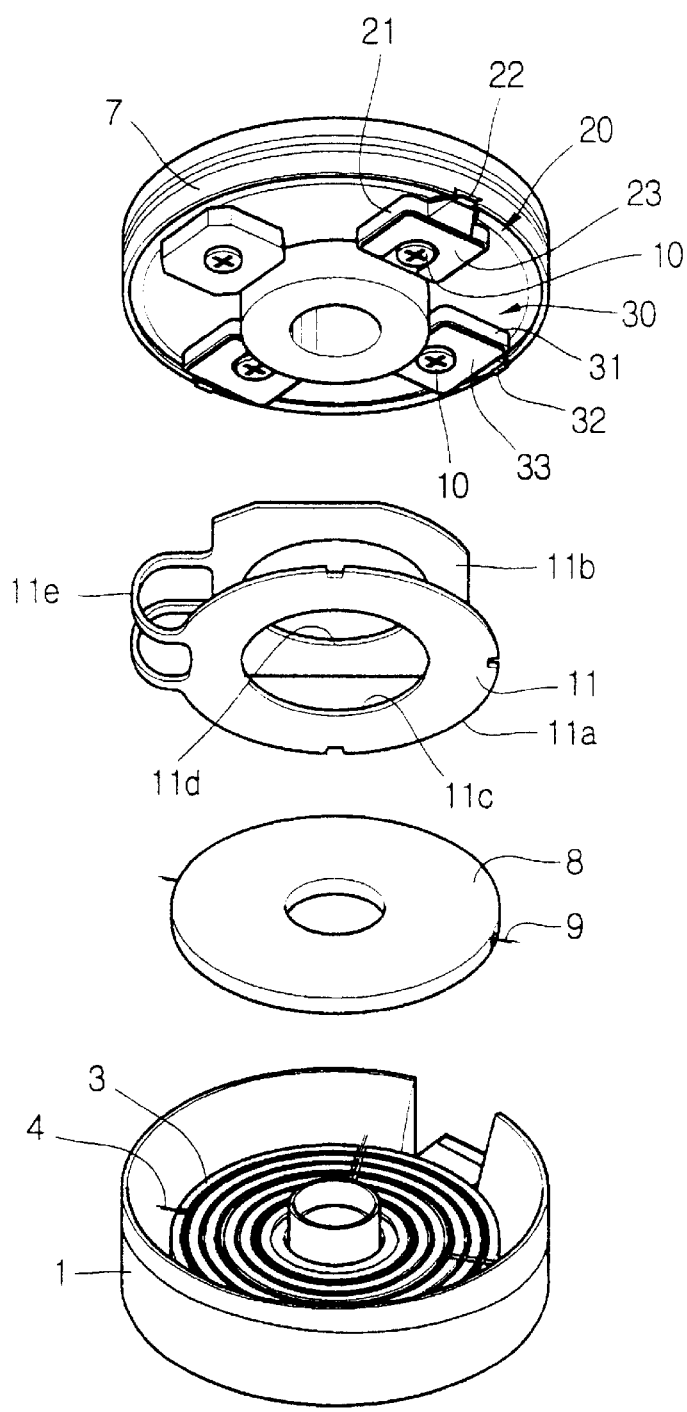
FIG. 2 is an exploded perspective view of the fixed-shaft type of head drum apparatus.
Figure 3:
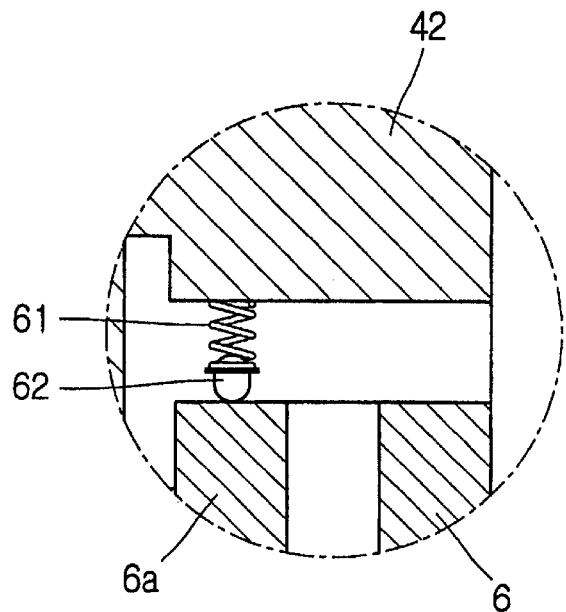
FIG. 3 is an enlarged view of the part "A" in FIG. 1, showing the ground structure of the head drum apparatus.

FIG. 1 is a cross-sectional view of a fixed-shaft type of head drum apparatus; FIG. 2 is an exploded perspective view of the fixed-shaft type of head drum apparatus; FIG. 3 is an enlarged view of the part "A" in FIG. 1, showing the ground structure of the head drum apparatus As shown in FIGS. 1 and 2, a general fixed-shaft type of head drum apparatus of a magnetic Y tape recording and reproducing apparatus comprises: a lower drum 1 having a recessed portion 1a formed therein; a stationary shaft 2 pressed and fitted into a center hole of the lower drum 1; a stationary transformer 3 attached to the bottom surface of the lower drum 1, the stationary transformer 3 having a plurality of concentrical channels 3a formed on the top surface thereof; a plurality of coils 4 wound in the respective channels 3a; an upper drum 7 rotatably coupled to the stationary shaft 2 via bearings 5 and 6 fixed to a middle portion and an upper portion, respectively, of the stationary shaft 2; a rotary transformer 8 attached to a bottom surface of the upper drum 7 such that a gap is formed between the rotary transformer 8 and the stationary transformer 3, the rotary transformer 8 having a plurality of concentrical channels 8a on the bottom surface; a plurality of lines of rotor coils 9 wound in the respective channels 8a of the rotary transformer 8; a head assembly 20 and a full-width erasing head assembly 30 fixed to the bottom surface of the upper drum 7 by means of screws 10; a signal transmitting means for transmitting signals between the rotor coils 9 of the rotary transformer 8 and the head assembly 20 and the full-width erasing head assembly 30; and a drum motor provided on the top portion of the stationary shaft 2 and the top surface of the upper drum 7.

The signal transmitting means uses a flexible printed circuit ("FPC") 11. Mounted to a portion of the pattern formed on the FPC 11 is a ceramic condenser (hereinafter referred to as a "chip") which acts as a filter for tuning the frequency band within the band of the full-width erasing head assembly 30.

The head assembly 20 and the full-width erasing head assembly 30 are provided with a head 22 and a full-width erasing head 32, respectively, on the leading end of head bases 21 and 31, respectively. The head assembly 20 and the full-width erasing head assembly 30 also have PCBs 23 and 33, respectively, with desired patterns on the bottom surfaces thereof. The head 22 and the full-width erasing head 32 are electrically connected to the PCBs 23 and 33, respectively.

The drum motor includes a motor stator 40 fixed to the top portion of the stationary shaft 2 and a motor rotor 50 fixed to the top surface of the upper drum 7.

Specifically, the motor stator 40 is fitted on the top portion of the stationary shaft 2 and includes a boss 42 into which a set screw 41 is radially screwed, a york 43 secured to the bottom surface of the boss 42, and a motor stator coil 44 mounted on the bottom surface of the york 43. The motor rotor 50 includes a plate 52 fixed to the top surface of the upper drum 7 by means of a plurality of screws 51, and a motor magnet 53 attached to the upper surface of the plate 52.

Formed on the bottom surface of the york 43 are certain patterns to which the motor stator coils 44 are electrically connected.

In the above fixed-shaft type of head drum apparatus, the upper drum 7 is rotated by electromagnetic activation of the drum motor provided to the top portion of the stationary shaft 2 and the top portion of the upper drum 7. The head 22 of the upper drum 7 reproduces signals from or records signals to the tape traveling around the outer peripheral surfaces of the upper and the lower drums 7 and 1, and the full-width erasing head 32 erases the information on the tape.

On the other hand, the signals from the head 22 and the full-width erasing head 32 are transmitted in sequence through the FPC 11 connected to the respective PCBs 23 and 33, the rotor coils 9 of the rotary transformer 8, and the stator coil 4 of the stationary transformer 3 to a controller, or vice versa.

In general, the fixed-shaft type of head drum apparatus described above includes a ground device for removing static electricity occurring in the upper drum 7 so as to make the apparatus electrically stable. The typical shape of the ground device will now be described.

It should be noted that, in the head drum apparatus, the essential characteristics of a ground element are low friction resistance and low tension due to frictional contact.

FIG. 3 shows a configuration of the ground device of the head drum apparatus. An elastic member 61, such as a compressed coil spring, is attached to a portion of the bottom surface of the boss 42, the elastic member 61 facing downward. A ground member 62 of a certain shape is fixed to the bottom surface of the elastic member 61. A lower end of the ground member 62 is in elastic contact with an outer race 6a of an upper bearing 6 so that a rotating portion as well as anon-rotating portion can be grounded.

In the above ground device of the head drum apparatus, it is difficult to attach the elastic member 61, such as a compressed coil spring, to the bottom surface of the boss 42, and the elastic member 61 is likely to become detached from the boss 42 after a long period of use due to its poor attachment strength.

Furthermore, in order to disassemble the elastic member 61 from the boss 42, it is necessary to disassemble the entire head drum apparatus, thereby resulting in consumption of a lot of time and expenditure of a great deal of effort for the after-sale service of the head drum apparatus.

Figure 4:
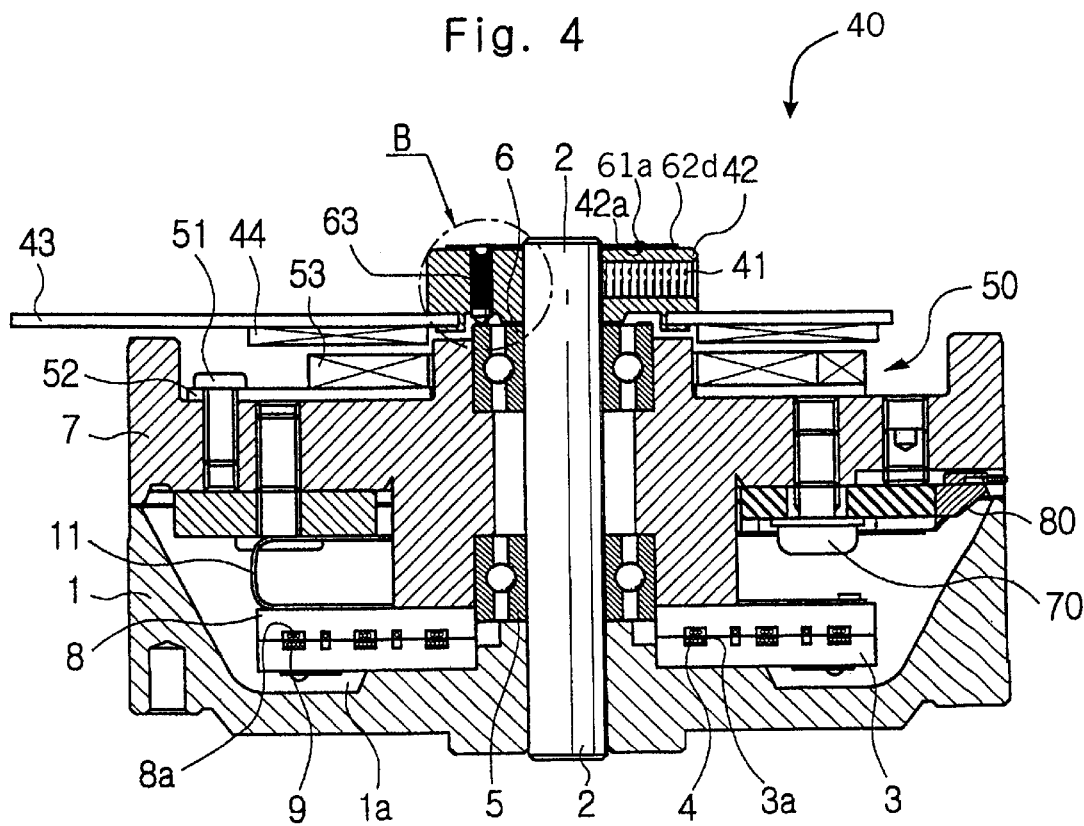
FIG. 4 is a cross-sectional view of a head drum apparatus for use in a magnetic tape recording and reproducing apparatus according to the present invention.
Figure 5:
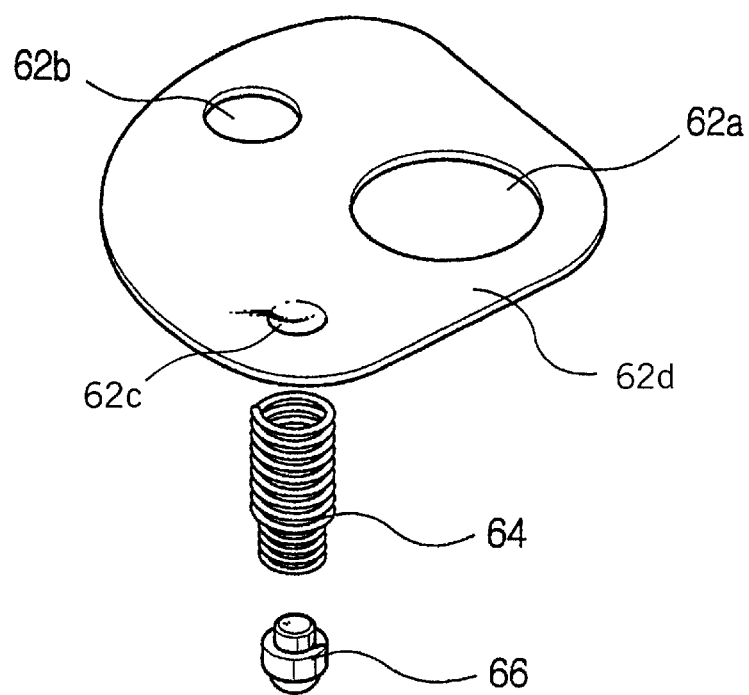
FIG. 5 is an exploded view showing the ground structure of the head drum apparatus according to the present invention.
Figure 6:
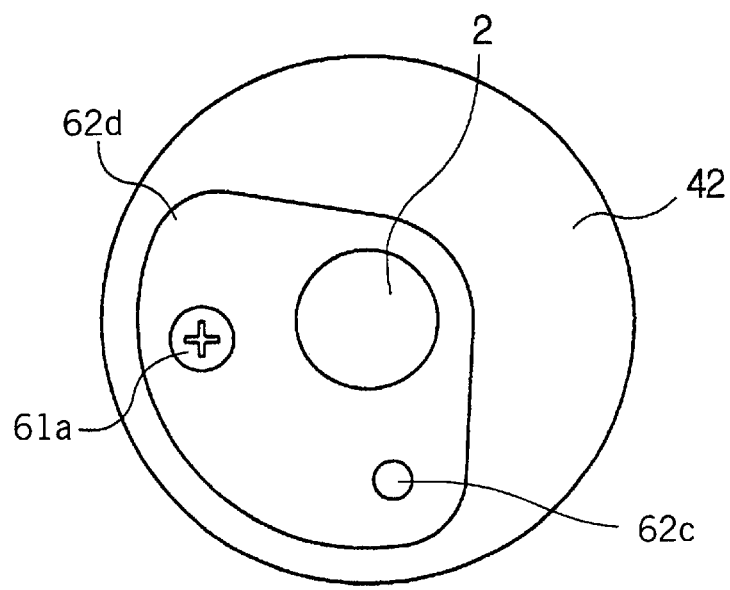
FIG. 6 is a top view of the head drum apparatus employing the ground device of the present invention.
Figure 7:
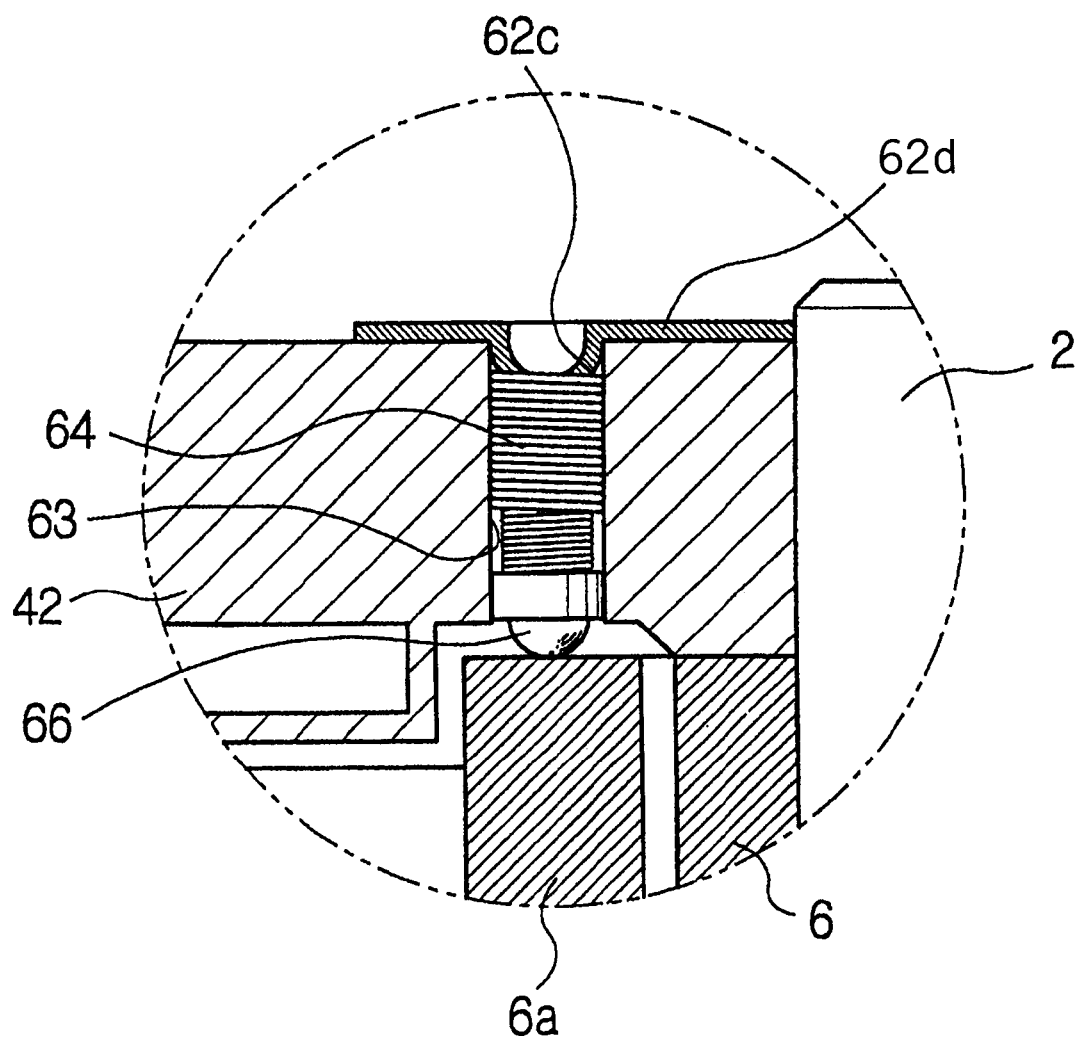
FIG. 7 is an enlarged view of the part "B" in FIG. 4, showing a major portion of the ground device of the head drum apparatus of the present invention.

FIG. 4 is a cross-sectional view of a head drum apparatus for use in a magnetic tape recording and reproducing apparatus according to the present invention; FIG. 5 is an exploded view showing the ground structure of the head drum apparatus according to the present invention; FIG. 6 is a top view of the head drum apparatus employing the ground device of the present invention; and FIG. 7 is an enlarged view of the part "B" in FIG. 4, showing a major portion of the ground device of the head drum apparatus of the present invention.

As shown in the drawings, the fixed-shaft type of head drum apparatus according to the present invention comprises: a lower drum 1 having a recessed portion la formed therein; a stationary shaft 2 pressed and fitted into a center hole of the lower drum 1; a stationary transformer 3 attached to the bottom surface of the lower drum 1, the stationary transformer 3 having a plurality of concentrical channels 3a formed on the top surface thereof; a plurality of coils 4 wound in the respective channels 3a; an upper drum 7 rotatably coupled to the stationary shaft 2 via bearings 5 and 6 fixed to a middle portion and an upper portion, respectively, of the stationary shaft 2; a rotary transformer 8 attached to the bottom surface of the upper drum 7 such that a gap is formed between the rotary transformer 8 and the stationary transformer 3, the rotary transformer 8 having a plurality of concentrical channels 8a formed on the bottom surface thereof; a plurality of lines of rotor coils 9 wound in the respective channels 8a of the rotary transformer 8; a plurality of head assemblies 70 fixed to the bottom surface of the upper drum 7 by means of screws 10; a signal transmitting means for transmitting signals between the rotor coils 9 of the rotary transformer 8 and the head assemblies 70; and a drum motor provided on the top portion of the stationary shaft 2 and the top surface of the upper drum 7.

The drum motor includes a motor stator 40 fixed to the top portion of the stationary shaft 2 and a motor rotor 50 fixed to the top surface of the upper drum 7. The motor stator 40 includes a boss 42 secured to the top portion of the stationary shaft 2 by means of a set screw 41 which is radially screwed into the boss 42, and a back york 43 fixed to the bottom surface of the boss 42. The motor rotor 50 includes a plate 52 secured to the top surface of the upper drum 7 by means of a plurality of screws and a motor magnet 53 attached to the top surface of the plate 52.

A ground device of the head drum apparatus according to the present invention comprises: an anchor member 62d anchored to the top surface of the boss 42 by means of a screw 61a; an elastic member 64 attached to the bottom surface of the anchor member 62d by soldering, the elastic member 64 extending downward through a bore 63 in the boss 42; and a ground member 66 fixed to the lower end of the elastic member 64, the ground member 66 having a tip shape and being always in elastic contact with an outer race 6a of an upper bearing 6.

The anchor member 62d is of a plate shape and has a hole 62a which is adapted to fit onto the stationary shaft 2, thereby preventing the anchor member 62d from moving unintentionally when it it is anchored to the boss 42 by means of the screw 61a.

The anchor member 62d has a hole 62b for the insertion of the screw 61a, and an embossed portion 62b formed on the bottom surface thereof.

Formed in the top surface of the boss 42, to which the anchor member 62d is anchored, is an aperture 42a which is in communication with the hole 62b. The anchor member 62d is anchored to the boss 42 by fitting the screw 61a through the hole 62b and into the aperture 42a.

The elastic member 64 is fixed to the embossed portion 62c by any conventional method, such as press-fitting or soldering.

Preferably, the elastic member 64 is a compressed coil spring exerting a force in a vertical direction, but elastic member 64 is not limited to such an embodument. The elastic member 64 may be any suitable element for elastically carrying the ground member 66.

In the ground device of the head drum apparatus of the present invention, the elastic member 64 is first fixed to the embossed portion 62c formed on the bottom surface of the anchor member 62d, and the ground member 66 is then attached to the lower end of the elastic member 64, thereby completing the ground device assembly.

The elastic member 64 and the ground member 66 of the ground device assembly are inserted into the bore 63 of the boss 42. At this time, the anchor member 62d is positioned in place by inserting the top end of the stationary shaft 2 into the hole 62a of the anchor member 62d.

Then, the screw 61a is screwed through the hole 62b and into the aperture 42a of the boss 42, thereby completing the assembly operation.

FIG. 7 shows the assembled ground device of the head drum apparatus of the present invention. The ground member 66 is maintained in contact with the outer race 6a of the bearing 6. In this arrangement, the elastic member 64 (such as a compressed coil spring) serves to exert a force on the ground member 66 such that the ground member 66 is kept in contact with the outer race 6a of the bearing 6 under the influence of an appropriate pressure.

In the ground device of the head drum apparatus of the present invention, the anchor member 62d is anchored to the fixed boss 42, and the ground member 66 is fixed to the lower end of the elastic member 64, which is secured to the anchor member 62d, and is maintained in contact with the outer race 6a of the bearing 6 under pressure, thereby effectively removing static electricity caused by the rotation of the upper drum 7.

On the other hand, if an unexpected problem occurs due to failure of the ground function or malfunction of the ground device, the condition of the elastic member 64 and the ground member 66 can be examined by unscrewing the screw 61a fitted into the boss 42 and separating the anchor member 62d therefrom, thereby performing maintenance or service of the ground device without much time or effort.

It should be noted that, in describing the rotating action of the upper drum 7 caused by motor stator 40 and motor rotor 50, and provided to the top portion of the stationary shaft 2 and top surface of the upper drum 7, respectively, a description of the recording and the reproducing of the signals on a magnetic tape by head assembly 70, and a description of the signal transmitting system, are omitted herein since they are the same as disclosed above relative to FIGS. 1–3.

As described above, the head drum apparatus in accordance with the present invention has a stationary shaft 2 which is pressed and fitted into the lower drum 1, the upper drum 7 is rotatably fixed to the stationary shaft 2 via bearings 5 and 6, and ground action is generated between the boss 42 fixed to the top portion of the stationary shaft 2 and the upper bearing 6. The apparatus comprises the ground device, including the anchor member 62d anchored to the upper surface of the boss 42, and the elastic member 64 fixed to the bottom surface of the anchor member 62d. The elastic member 64 extends downwardly through the bore 63 in the boss 42, and the ground member 66 is fixed to the lower end of the elastic member 64. The ground member 66 is in elastic contact with the outer race $^6a$ of the upper bearing 6. Accordingly, the assembly and the disassembly operations of the components of the ground device become simpler and easier, thereby increasing the productivity and enhancing the service operation efficiency thereof.

Although the invention has been shown and described with respect to the preferred embodiment, it will be understood by those skilled in the art that various changes and modifications may be made without departing from the spirit and the scope of the invention as defined in the following claims.

What is claimed is:

1. A head drum apparatus, comprising:

a stationary shaft;

an upper drum rotatably coupled to the stationary shaft via at least one bearing;

a boss fixed to a top portion of the stationary shaft;

a motor mounted in a top portion of the apparatus; and a ground device mounted in said top portion of the apparatus;

wherein said ground device comprises an anchor member anchored to an upper surface of the boss, an elastic member fixed to a bottom surface of the anchor member and extending downwardly through a bore in the boss, and a ground member fixed to a lower end of the elastic member, the ground member being in elastic contact with an outer race of said et least one bearing.

2. The head drum apparatus according to claim 1, wherein the anchor member has a hole into which the stationary shaft is fitted, whereby the anchor member is prevented from moving into a position wherein the anchor member is anchored to the boss.

3. The head drum apparatus according to claim 1, wherein the elastic member comprises a compressed coil spring.

4. The head drum apparatus according to claim 1, wherein said at least one bearing comprises an upper bearing disposed adjacent to the top portion of said stationary shaft.

5. The head drum apparatus according to claim 1, wherein said motor comprises a motor rotor mounted to a top surface of the upper drum.

6. The head drum apparatus according to claim 5, wherein said motor further comprises a motor stator fixed to the boss and disposed opposite to the motor rotor.

7. The head drum apparatus according to claim 1, wherein said motor comprises a motor stator fixed to the boss.

8. The head drum apparatus according to claim 1, said apparatus further comprising a lower drum.

9. The head drum apparatus according to claim 8, wherein said stationary shaft is pressed and fitted into a center hole in said lower drum.

10. The head drum apparatus according to claim 1, wherein said boss is fixed to the top portion of the stationary shaft by a set-screw.

11. A head drum apparatus, comprising:

a stationary shaft;

an upper drum rotatably coupled to the stationary shaft via at least one bearing;

a boss fixed to a top portion of the stationary shaft;

a motor mounted in a top portion of the apparatus; and a ground device mounted in said top portion of the apparatus;

wherein said ground device comprises an anchor member anchored to an upper surface of the boss, an elastic member fixed to a bottom surface of the anchor member and extending downwardly through a bore in the boss, and a ground member fixed to a lower end of the elastic member, the ground member being in elastic contact with an outer race of said at least one bearing; and wherein the elastic member comprises a compressed coil spring, and the anchor member has an embossed portion formed therein, said embossed portion extending downward from the bottom surface of said anchor member so as to extend into and be received by an interior portion of said compressed coil spring.

12. The head drum apparatus according to claim 11, wherein the anchor member has a hole into which the stationary shaft is fitted, whereby the anchor member is prevented from moving into a position wherein the anchor member is anchored to the boss.

13. The head drum apparatus according to claim 11, wherein said at least one bearing comprises an upper bearing disposed adjacent to the top portion of said stationary shaft.

14. The head drum apparatus according to claim 11, wherein said motor comprises a motor rotor mounted to a top surface of the upper drum.

15. The head drum apparatus according to claim 14, wherein said motor further comprises a motor stator fixed to the boss and disposed opposite to the motor rotor.

16. The head drum apparatus according to claim 11, wherein said motor comprises a motor stator fixed to the boss.

17. The head drum apparatus according to claim 11, said apparatus further comprising a lower drum.

18. The head drum apparatus according to claim 17, wherein said stationary shaft is pressed and fitted into a center hole in said lower drum.

19. The head drum apparatus according to claim 11, wherein said boss is fixed to the top portion of the stationary shaft by a set-screw.

20. A ground device for a head drum apparatus which includes a stationary shaft, an upper drum rotatably coupled to the stationary shaft via at least one bearing, a boss fixed to a top portion of the stationary shaft, and a motor mounted in a top portion of the apparatus;

wherein said ground device comprises:

an anchor member anchored to an upper surface of the boss;

an elastic member fixed to a bottom surface of the anchor member and extending downwardly through a bore in the boss; and a ground member fixed to a lower end of the elastic member, the ground member being in elastic contact with an outer race of said at least one bearing;

wherein the anchor member has a hole into which the stationary shaft is fitted, whereby the anchor member is prevented from moving into a position wherein the anchor member is anchored to the boss.

21. The ground device according to claim 20, wherein the elastic member comprises a compressed coil spring.

22. A ground device for a head drum apparatus which includes a stationary shaft, an upper drum rotatably coupled to the stationary shaft via at least one bearing, a boss fixed to a top portion of the stationary shaft, and a motor mounted in a top portion of the apparatus;

wherein said ground device comprises:

an anchor member anchored to an upper surface of the boss;

an elastic member fixed to a bottom surface of the anchor member and extending downwardly through a bore in the boss; and a ground member fixed to a lower end of the elastic member, the ground member being in elastic contact with an outer race of said at least one bearing;

wherein the elastic member comprises a compressed coil spring, and the anchor member has an embossed portion formed therein, said embossed portion extending downward from the bottom surface of said anchor member so as to extend into and be received by an interior portion of said compressed coil spring.

* * * * *